US012588113B2

(12) United States Patent
Lee et al.

(10) Patent No.: US 12,588,113 B2
(45) Date of Patent: Mar. 24, 2026

(54) MICROWAVE OVEN CHILD RESISTANT DOOR

(71) Applicant: Haier US Appliance Solutions, Inc., Wilmington, DE (US)

(72) Inventors: Byung Cheon Lee, Seongnam-si (KR); Hyuk-chul Kwon, Seongnam (KR); Ju Chan Park, Gyeonggi-do (KR); Youngjin Oh, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1010 days.

(21) Appl. No.: 17/724,015

(22) Filed: Apr. 19, 2022

(65) Prior Publication Data

US 2023/0337338 A1 Oct. 19, 2023

(51) Int. Cl.
*H05B 6/64* (2006.01)
*H05B 6/68* (2006.01)

(52) U.S. Cl.
CPC .................................. *H05B 6/6414* (2013.01)

(58) Field of Classification Search
CPC ............ A61B 18/1447; A61B 18/1815; A61B 2017/0034; A61B 2018/00077; A61B 2018/00589; A61B 2018/00595; A61B 2018/00607; A61B 2018/0063; A61B 2018/00982; A61B 2018/00994; A61B 2018/1455; A61B 2018/1823; A61B 2018/1861; A61B 18/1442; A61B 18/1445; A61B 2017/00367; A61B 2017/00398; A61B 2018/00601; A61B 2018/00755; A61B 2018/00875; G16B 20/00; G16B 20/20; G16B 20/40; G16B 30/00; H05B 6/6414
USPC ....... 219/723, 722, 724, 702, 716, 739, 756; 126/192, 197; 200/50.01–50.4, 50.12, 200/50.13, 50.18
See application file for complete search history.

(56) References Cited

U.S. PATENT DOCUMENTS 6,921,888 B2 7/2005 Ryu
9,745,788 B2 * 8/2017 Becker ............... G01R 27/2605

FOREIGN PATENT DOCUMENTS

CN 203704073 U 7/2014
CN 203837055 U 9/2014
CN 208089030 U 11/2018
(Continued)

OTHER PUBLICATIONS

Translation of KR200162052Y1 (or KR2019990010889), "Apparatus for locking the door of a microwave oven", Dec. 1, 1999, by Espacenet. (Year: 1999).*

*Primary Examiner* — Quang T Van
(74) *Attorney, Agent, or Firm* — Dority & Manning, P.A.

(57) ABSTRACT

A microwave oven is provided having a cabinet defining a cooking chamber, a door pivotably attached to the cabinet and a button for opening the door. The door may be configured to selectively allow entry to the cooking chamber. The button may include an outer panel and a primary body. The outer panel may be moveable between a locked position and an unlocked position. The primary body may be located below the outer panel. The primary body may be accessible in the unlocked position. The button may further include a spring, the spring in biased engagement with the outer panel. The spring may motivate the outer panel to the locked position.

18 Claims, 4 Drawing Sheets

(56) References Cited

FOREIGN PATENT DOCUMENTS

| | | | |
|---|---|---|---|
| JP | 2003294237 | A | 10/2003 |
| KR | 200162052 | Y1 | 12/1999 |

* cited by examiner

MICROWAVE OVEN CHILD RESISTANT DOOR

FIELD OF THE INVENTION

The present subject matter relates generally to appliances, and more particularly to microwave oven appliances.

BACKGROUND OF THE INVENTION

Microwave oven appliances generally include a cabinet that defines a cooking chamber. The cooking chamber may receive food items for cooking. A door may be pivotally mounted to the cabinet to provide access to the cooking chamber. Microwave oven appliances generally heat food by activating an energy source, such as a magnetron, to generate cooking energy or microwaves. To contain the radioactive energy waves, microwave oven appliances generally have a door latch mechanism to latch the door in a closed position during cooking. Furthermore, an indication to a controller that the door is closed is typically provided to ensure that the microwave oven appliance may be operated safely.

In addition to these safeguards while the microwave oven is on, inadvertent opening of a microwave door may also be desired. For example, food or items inside a microwave may have an increased temperature following cooking, and inadvertent opening of the microwave door to get food or items out of the microwave oven appliance may be undesirable.

Accordingly, limiting access to the cooking chamber of a microwave oven would be desirable. Additionally or alternatively, a microwave that prevents inadvertent opening of a microwave oven appliance door would be beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a microwave oven is provided, having a vertical direction, a transverse direction, and a lateral direction. The microwave oven may include a cabinet defining a cooking chamber, a door pivotably attached to the cabinet, and a button for opening the door. The door may be configured to selectively allow entry to the cooking chamber. The button may include an outer panel moveable between a locked position and an unlocked position, and a primary body located below the outer panel, the primary body being accessible in the locked position.

In another exemplary aspect of the present disclosure, a microwave oven is provided, having a vertical direction, a transverse direction, and a lateral direction. The microwave oven may include a cabinet defining a cooking chamber, a door pivotably attached to the cabinet, and a button for opening the door. The door may be configured to selectively allow entry to the cooking chamber. The button may include an outer panel moveable between a locked position and an unlocked position, a primary body located below the outer panel, the primary body being accessible in the locked position, and a spring in biased engagement with the outer panel. The spring may motivate the outer panel to the locked position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same of similar reference numerals in the figures denotes the same or similar features unless the context indicates otherwise.

DETAILED DESCRIPTION

Figure 1:
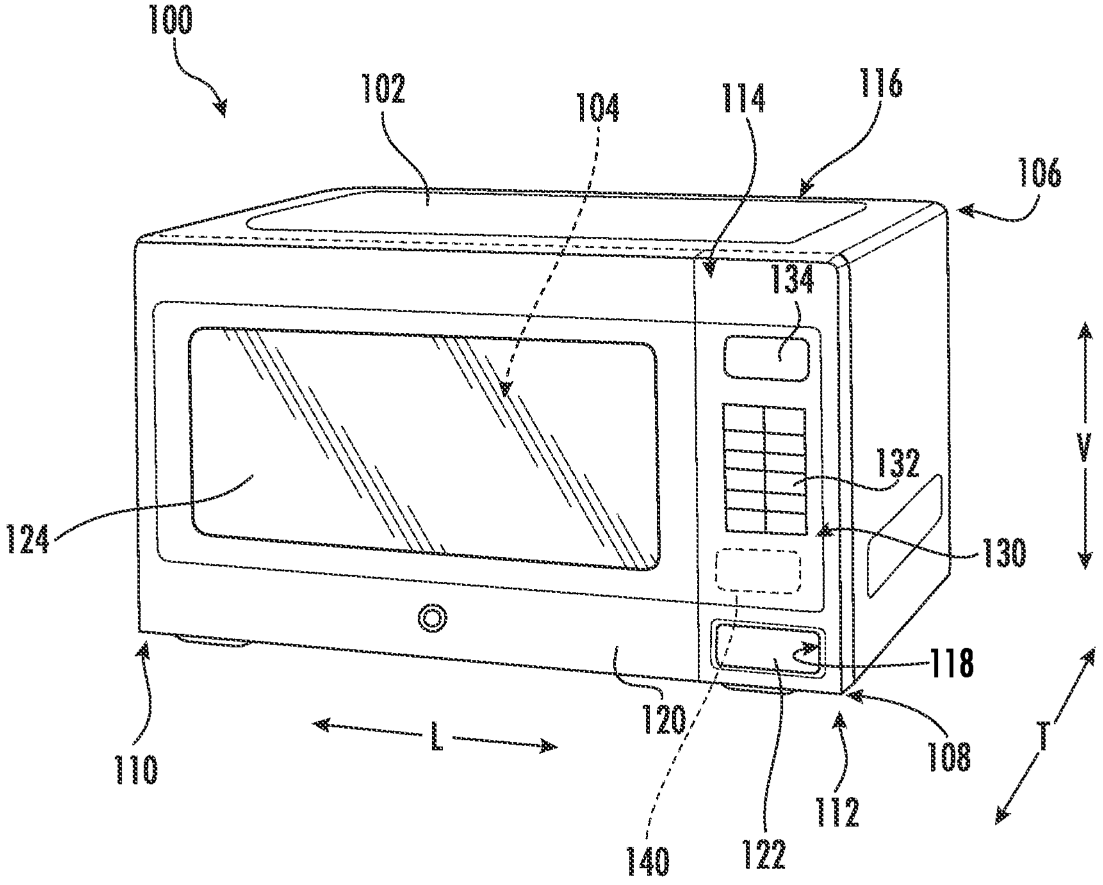
FIG. 1 provides a perspective view of a microwave appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term “or” is generally intended to be inclusive (i.e., “A or B” is intended to mean “A or B or both”). The terms “first,” “second,” and “third” may be used interchangeably to distinguish one component from another and are not intended to signify location or importance of the individual components. Terms such as “inner” and “outer” refer to relative directions with respect to the interior and exterior of the household appliance, and in particular the chamber(s) defined therein. For example, “inner” or “inward” refers to the direction towards the interior of the microwave appliance. Terms such as “left,” “right,” “front,” “back,” “top,” or “bottom” are used with reference to the perspective of a user accessing the appliance (e.g., when the door is in the closed position). For example, a user stands in front of the appliance to open a door and reaches into the internal chamber(s) to access items therein.

As used herein, the term "article" may refer to, but need not be limited to dishes, pots, pans, silverware, and other cooking utensils and items that can be used in a microwave appliance. Furthermore, as used herein, terms of approximation, such as "approximately," "substantially," or "about," refer to being within a ten percent margin of error.

The present invention advantageously provides a microwave appliance that may provide a child resistant button for opening a microwave door of the microwave appliance. The button may have two steps or motions in order to permit the microwave door to open. This may advantageously minimize unwanted opening of the microwave door, for example, by a child (e.g., while confirming to UL 923 Revision 7). Additionally or alternatively, embodiments described herein may generally lessen or avoid inadvertent opening of the microwave door.

FIG. 1 provides a front, perspective view of a microwave oven 100 as may be employed with the present subject matter. Microwave oven 100 includes an insulated cabinet 102. Cabinet 102 defines a cooking chamber 104 for receipt of food items for cooking. As will be understood by those skilled in the art, microwave oven 100 is provided by way of example only, and the present subject matter may be used in any suitable microwave oven, such as a countertop microwave oven, an over-the-range microwave oven, etc. In addition, aspects of the present subject matter may be used in other suitable residential or commercial appliances, e.g., a gas or electric oven range appliance, a dishwasher, a washing machine, a refrigerator appliance, etc. Thus, the example embodiment shown in FIG. 1 is not intended to limit the present subject matter to any particular cooking chamber configuration or arrangement.

As illustrated, microwave oven 100 generally defines a vertical direction V, a lateral direction L, and a transverse direction T, each of which is mutually perpendicular, such that an orthogonal coordinate system is generally defined. Cabinet 102 of microwave oven 100 extends between a top 106 and a bottom 108 along the vertical direction V, between a first side 110 (left side when viewed from front) and a second side 112 (right side when viewed from front) along the lateral direction L, and between a front 114 and a rear 116 along the transverse direction T.

Microwave oven 100 includes a door 120 that is pivotably or rotatably attached to cabinet 102 in order to permit selective access to cooking chamber 104. Microwave oven 100 may include a door release button 122 that selectively allows entry into cooking chamber 104 (e.g., in response to engagement or pressing of the door release button 122). In some embodiments, a handle 236 is mounted to door 120 to assist a user with opening and closing door 120 in order to access cooking chamber 104. As an example, a user can engage door release button 122 and afterwards, pull on the handle 236 mounted to door 120 to assist in opening or closing door 120 to access cooking chamber 104. In some embodiments, a latch or equivalent mechanism may be used to engage door 120, maintaining door 120 in a closed position until door 120 is motivated or released by door release button 122, as will be discussed in more detail below. Glass window panes 124 may provide for viewing the contents of cooking chamber 104 when door 120 is closed and also assist with insulating cooking chamber 104.

In some embodiments, front 114 defines a body cavity 118. Body cavity 118 may be defined through front 114 and into cabinet 102 in transverse direction T. Body cavity 118 may receive a primary body 204 of button 122 as will be described in detail below.

Microwave oven 100 is generally configured to heat articles, e.g., food or beverages, within cooking chamber 104 using electromagnetic radiation. Microwave appliance 100 may include various components which operate to produce the electromagnetic radiation, as is generally understood. For example, microwave appliance 100 may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 104.

The structure and intended function of microwave ovens are generally understood by those of ordinary skill in the art and are not described in further detail herein. According to alternative embodiments, microwave oven may include one or more heating elements, such as electric resistance heating elements, gas burners, other microwave heating elements, halogen heating elements, or suitable combinations thereof, are positioned within cooking chamber 104 for heating cooking chamber 104 and food items positioned therein.

Referring again to FIG. 1, a user interface panel 130 and a user input device 132 may be positioned on an exterior of the cabinet 102. The user interface panel 130 may represent a general purpose Input/Output ("GPIO") device or functional block. In some embodiments, the user interface panel 130 may include or be in operative communication with user input device 132, such as one or more of a variety of digital, analog, electrical, mechanical, or electro-mechanical input devices including rotary dials, control knobs, push buttons, and touch pads. The user input device 132 is generally positioned proximate to the user interface panel 130, and in some embodiments, the user input device 132 may be positioned on the user interface panel 130. The user interface panel 130 may include a display component 134, such as a digital or analog display device designed to provide operational feedback to a user.

Generally, microwave oven 100 may include a controller 140 in operative communication with the user input device 132. The user interface panel 130 of the microwave oven 100 may be in communication with the controller 140 via, for example, one or more signal lines or shared communication busses, and signals generated in controller 140 operate microwave oven 100 in response to user input via the user input devices 132. Input/Output ("I/O") signals may be routed between controller 140 and various operational components of microwave oven 100. Operation of microwave oven 100 can be regulated by the controller 140 that is operatively coupled to the user interface panel 130.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of microwave oven 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, a controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 3:
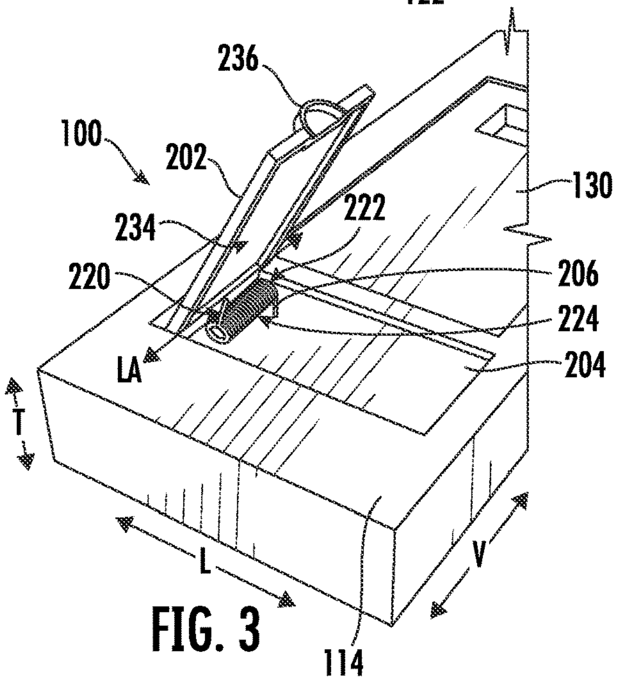
FIG. 3 provides a perspective view of an exemplary second step of the two-step door button of FIG. 2.
Figure 4:
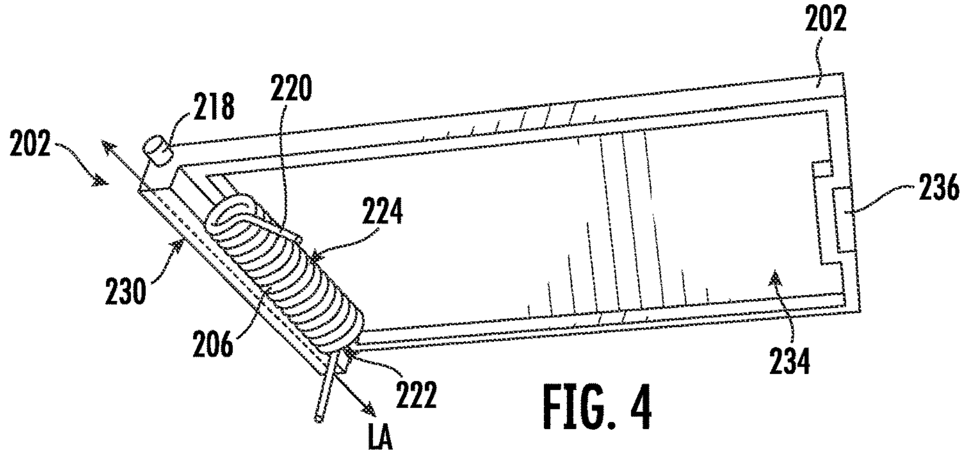
FIG. 4 provides a perspective view of an exemplary outer panel of the exemplary two-step door button of FIG. 2.
Figure 5:
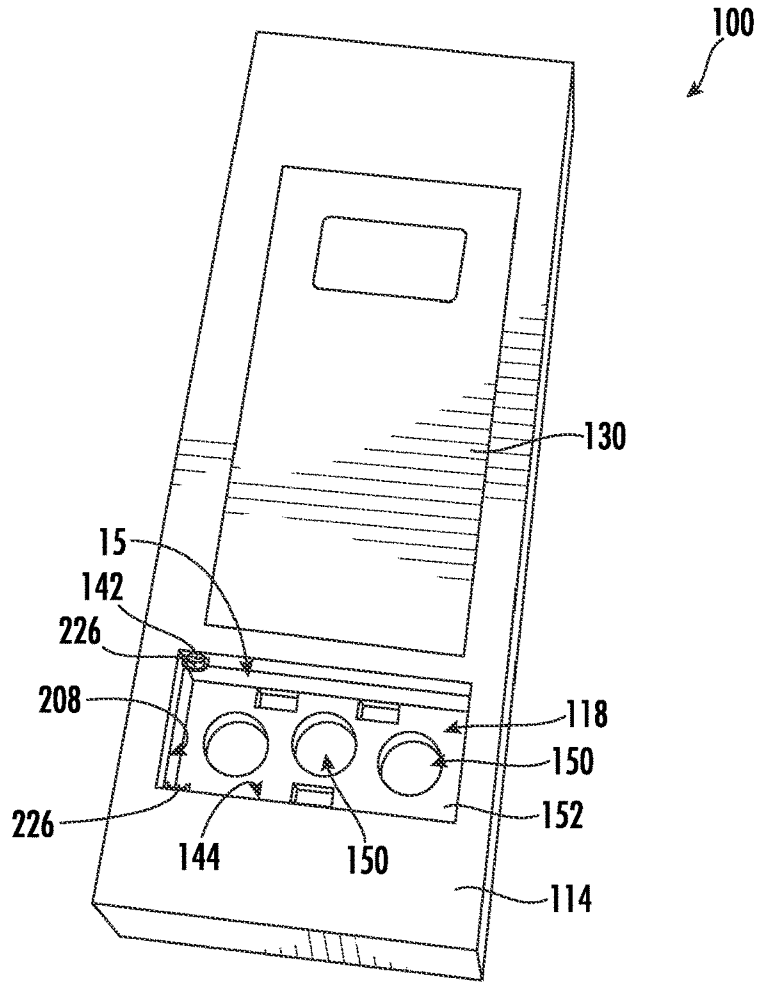
FIG. 5 provides a perspective view of an exemplary control panel of the exemplary microwave appliance of FIG. 1.

Turning generally to FIGS. 2 through 9, as previously described, microwave oven 100 further includes button 122 received, at least in part, within body cavity 118. As stated above, body cavity 118 may be defined by front 114. In some embodiments, body cavity 118 may extend into microwave 100 in transverse direction T and may extend along front 114 in lateral direction L. A body edge 208 may define a side of body cavity 118, body edge 208 extending perpendicular to front 114, and into microwave 100 in transverse direction T. In some embodiments, body edge 208 may include a top body edge 142 and a bottom body edge 144, as shown in FIG. 5.

When assembled, button 122 may selectively release or unsecure door 120 (e.g., to open door 120). Button 122 includes an outer panel 202 and a primary body 204 connected or proximal to outer panel 202. As will be described in detail below, outer panel 202 may be movable between an unlocked position and a locked position, which selectively permits and restricts access to primary body 204, as will be described in detail below.

Figure 7:
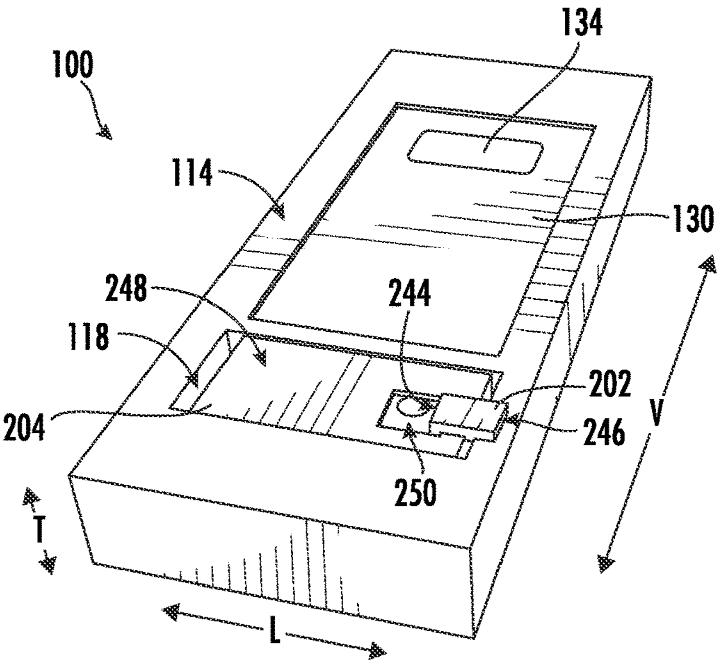
FIG. 7 provides a perspective view of an alternate exemplary two-step door button of the exemplary microwave appliance of FIG. 1.
Figure 8:
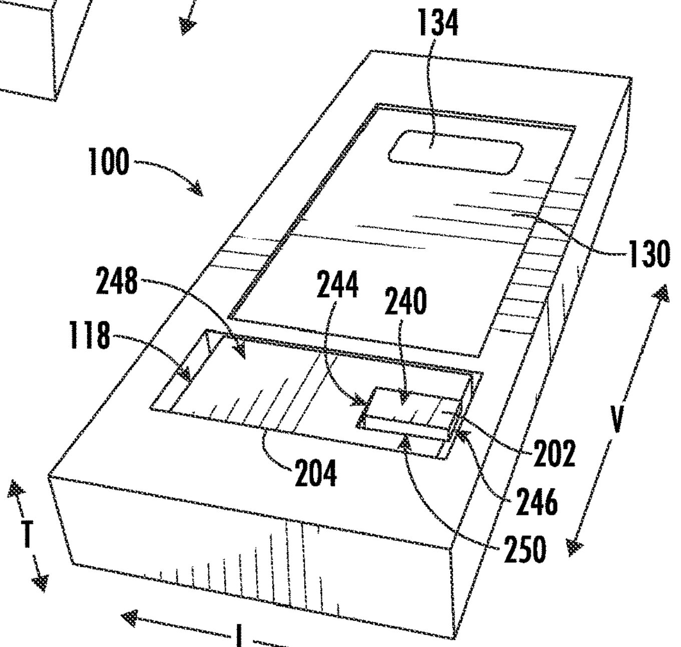
FIG. 8 provides a perspective view of an alternative exemplary second step of the two-step door button of FIG. 7.

As shown, primary body 204 is located behind the outer panel 202 (e.g., in transverse direction T). In some embodiments, primary body 204 is generally located along front 114. Primary body 204 may be provided as or include a solid or rigid member defining a forward-facing surface (e.g., which may be pressed or engaged by a user). When assembled, primary body 204 may be biased toward front 114, or biased toward an unengaged position. As shown, primary body 204 fits securely into body cavity 118 and moves transversely into body cavity 118 when engaged or motivated to release or open door 120. Primary body is the part of button 122 that engages to open door 120. As shown, primary body 204 is connected to outer panel 202 (e.g., behind outer panel 202 along the transverse direction T). The connection between primary body 204 and outer panel 202 may be a direct or an indirect connection. In some embodiments, primary body 204 and outer panel 202 may be attached (e.g., slidably attached as shown in FIGS. 7 and 8). In some embodiments, primary body 204 is below or behind outer panel 202 (e.g., in transverse direction T toward cooking chamber 104 or rear 116). Primary body 204 may be received within body cavity 118. Body cavity 118 may be partially defined by a body edge 208. Primary body 204 may be adjacent to body edge 208 within body cavity 118. In some embodiments, primary body 204 is slidable along body edge 208 within body cavity 118 when button 122 is in the unlocked position. Thus, the primary body 204 may be accessible in the unlocked position. By contrast, primary body 204 may be inactivated, non-activatable, non-engageable, immovable or inaccessible to movement when in the locked position. Thus, the primary body 204 may be inaccessible (e.g., to a user) in the locked position.

Figure 6:
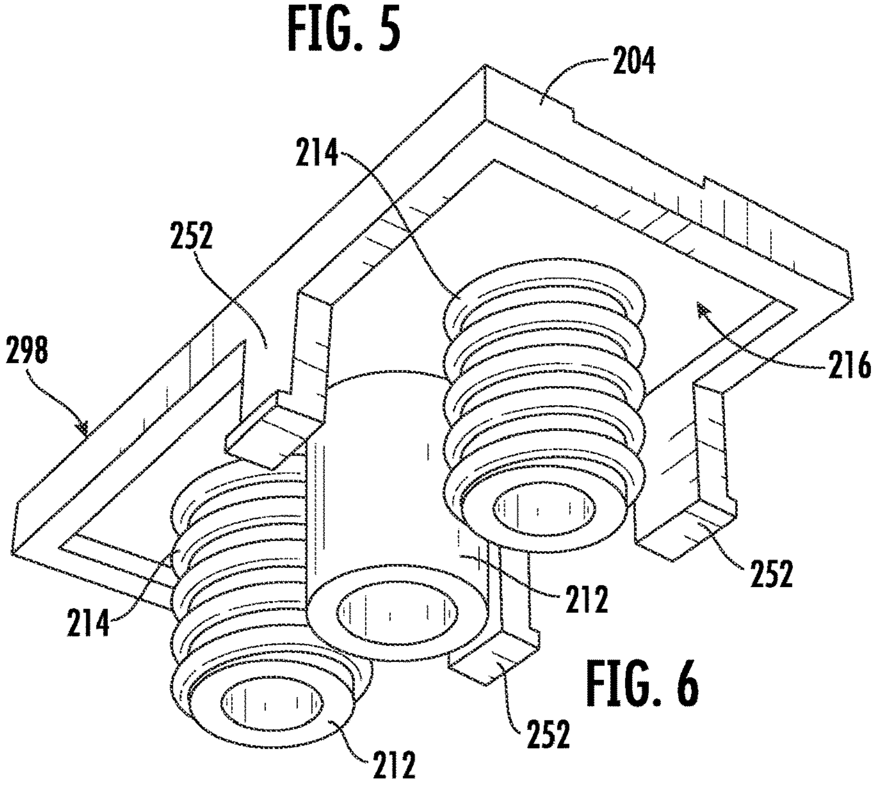
FIG. 6 provides a perspective view of an exemplary primary body of the exemplary two-step door button of FIG. 2.
Figure 9:
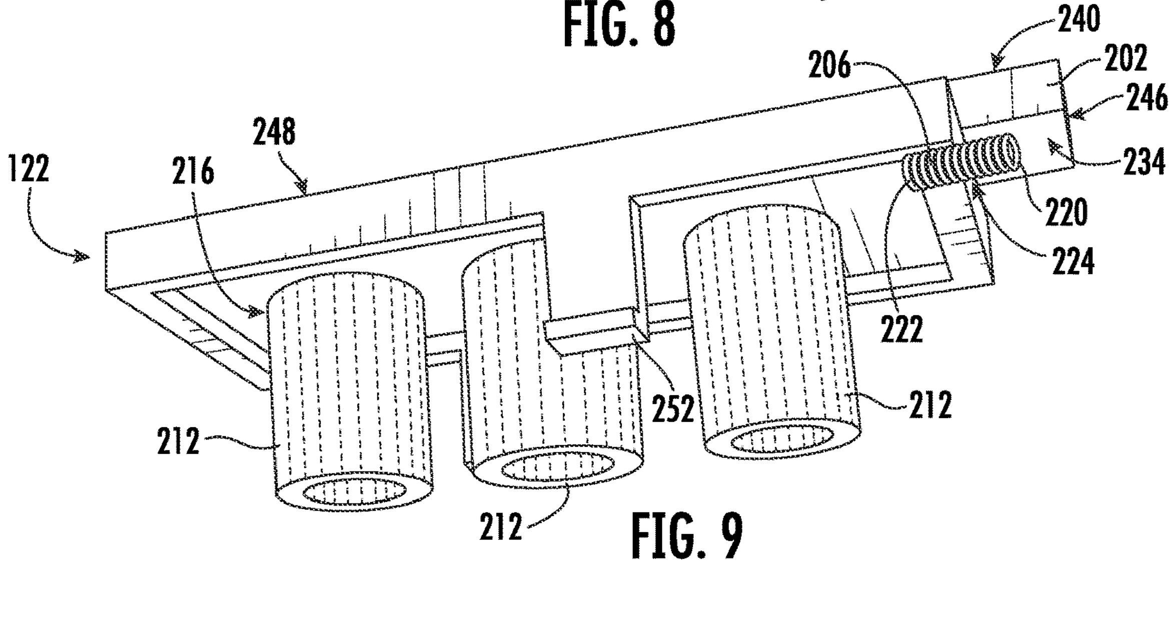
FIG. 9 provides a perspective view of a portion of the alternative exemplary two-step door button of FIG. 7.

As shown in FIGS. 6 and 9, primary body 204 may include at least one alignment protrusion 212 (e.g., protrusion 212). Alignment protrusions 212 may attach to an underside surface 216 of primary body 204. Alignment protrusions 212 may align sliding movement of primary body 204 within body cavity 118. As shown, there may be multiple (e.g., three) alignment protrusions 212. The alignment protrusions may align with an equal number of alignment holes 150 within body cavity 118, such as at an inner body cavity edge 152. Inner body cavity edge 152 may be located transversely inward from cabinet 102 and may be a surface defining body cavity 118. Alignment protrusion 212 may be arranged to algin with and extend partially into alignment holes 150 (e.g., along the transverse direction). Primary body 204 may further include seating tabs 252, which may be held within seating holes 154. Seating tabs 252 may rest against a rear or rearward-facing surface behind or within body cavity 118, thereby restraining primary body 204 in body cavity 118 (e.g., to prevent primary body 204 from popping out of body cavity 118). During use, engagement of primary body 204 may include movement of alignment protrusions 212 further into alignment holes 150 in transverse direction T. Alignment protrusions 212 may engage one or more mechanical mechanisms to release door 120 (e.g., via a latch) or may engage one or more electronic sensors to communicate with controller 140 to release door 120, as is otherwise understood.

In some embodiments, primary body 204 may further include at least one body spring 214. Body spring 214 may attach to underside surface 216 of primary body 204. When assembled, body spring 214 may aid in biasing primary body 204 toward an inactivated or unengaged state. In certain embodiments, body spring 214 coils around alignment protrusion 212, extending transversely into cabinet 102. Body spring 214 may further bias primary body 204 toward front 114 when unengaged or unmotivated to release door 120.

Generally, primary body 204 is engaged to release or unsecure door 120, allowing door 120 to open and gain access to cooking chamber 104. For example, depression of primary body 204 into body cavity 118 may prompt or engage a mechanism to open door 120, as is generally understood. Nonetheless, although shown as a slidable button, primary body 204 may include or be provided as another suitable user-engagement mechanism (e.g., knob, paddle, etc.) to prompt the opening of door 120 by a suitable mechanical or electrical assembly, as is also generally understood.

Figure 2:
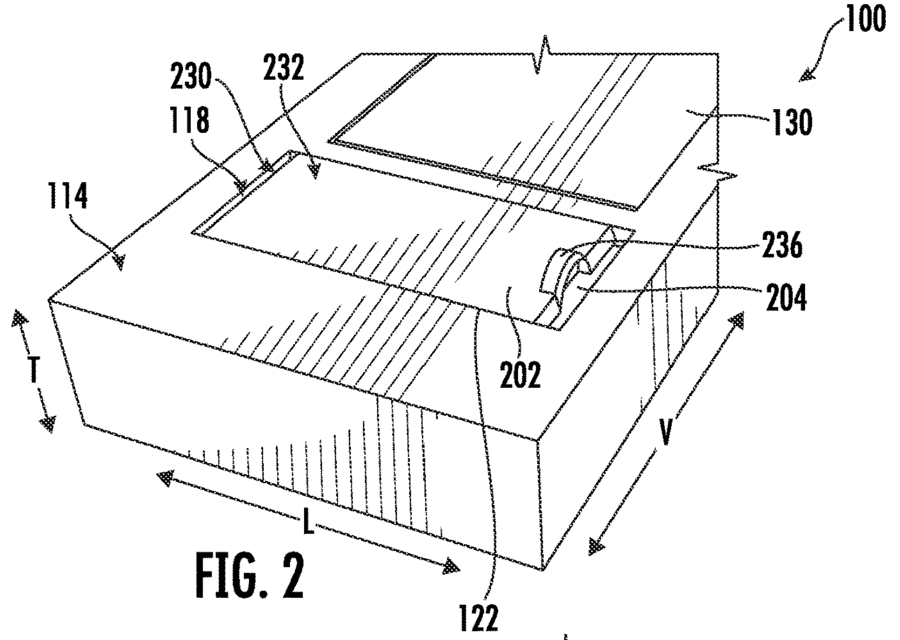
FIG. 2 provides a perspective view of an exemplary two-step door button of the exemplary microwave appliance of FIG. 1.

Turning especially to FIGS. 2 through 4, 7 and 8, outer panel 202 is generally located forward from or outside primary body 204. For instance, outer panel 202 may be located forward in transverse direction T of primary body 204. Outer panel 202 may further be at least flush or in line with front 114 of cabinet (as in FIG. 2) in transverse direction T, with at least a portion of outer panel 202 extending forward of front 114 in transverse direction T. In some embodiments, outer panel 202 is attached to front 114. For example, outer panel 202 may be pivotably attached to front 114 at top body edge 142 and bottom body edge 144, as shown in FIG. 3. In some embodiments, outer panel 202 is attached to primary body 204. For example, outer panel 202 may be attached at a primary front side 248 of primary body 204.

In some embodiments, front side 248 defines a primary notch 250 that extends inward in transverse direction T. At least a portion of outer panel 202 may attach within a portion of primary notch 250, as shown in FIGS. 7 and 8. Outer panel 202 may be slidable along primary notch 250, between the locked position (FIG. 7) and unlocked position (FIG. 8). In some embodiments, outer panel 202 may slide in lateral direction L. Outer panel 202 may further be attached to spring 206. For example, as shown in FIG. 4, spring 206 may be located on an inner side 234 of outer panel 202.

Spring 206 is generally in biased engagement with the outer panel 202. For example, spring 206 may attach to outer panel 202 and also bias outer panel 202 in the locked position. In other words, spring 206 generally biases outer panel 202 in the locked position. For example, spring 206 may bias outer panel 202 to cover primary body 204 (e.g., as shown in FIG. 2) or spring may extend over a portion of primary body 204 and a portion of front 114 as shown in FIG. 7.

Outer panel 202 may generally move between the unlocked position and the locked position. Generally, door 120 may be held closed and cooking chamber 104 may be inaccessible when in the locked position, primary body 204 being covered by outer panel 202. According to the arrangement, outer panel 202 may prevent movement, access, or engagement of primary body 204 in the locked position. In turn, in the unlocked position, outer panel 202 may be moved apart from primary body 204. In turn, door 120 may be releasable and configured to be opened, allowing access to cooking chamber 104 by way of primary body 204 engagement (e.g., compression rearward in transverse direction T).

As an example and turning especially to the embodiments of FIGS. 2 through 4, panel 202 may be rotatable or pivotable along axis LA (e.g., perpendicular to transverse direction T). From the locked position, panel 202 may pivot along axis LA outwards from front 114 into the unlocked position. During use, primary body 204 is accessible in unlocked position, as outer panel 202 is pivoted away from primary body 204 along axis LA.

As another example and turning especially to the embodiments of FIGS. 7 through 9, panel 202 may be slidable or translatable (e.g., along a direction perpendicular to transverse T) between the locked position (FIG. 7) and the unlocked position (FIG. 8). In locked position, panel 202 may be forward of both front 114 and primary body 204. Outer panel 202 may further cover a portion of front 114 and primary body 204, preventing engagement of primary body 204. In other words, outer panel 202 straddles both primary body 204 and front 114 in the locked position, preventing movement of primary body 204, preventing engagement of button 122, or otherwise preventing release of door 120. In unlocked position, outer panel 202 is moved from locked position in a direction perpendicular to transverse direction T. In turn, outer panel 202 may be spaced apart (e.g., vertically or laterally) from the primary body 204. In some embodiments, outer panel 202 may move away from door 120 in lateral direction L or may move in vertical direction V. In some embodiments, in unlocked position, outer panel 202 covers a portion of primary body 204. For example, as shown in FIG. 8, outer panel 202 in the unlocked position sits in primary notch 250 and covers a portion of primary body 204 while being spaced apart from (e.g., not covering) front 114. In alternative embodiments, in the unlocked position, outer panel 202 covers a portion of front 114 (not shown) and does not cover primary body 204. In either instance, primary body 204 is able to be engaged in the unlocked position, with outer panel 202 not straddling both primary body 204 and front 114. In other words, outer panel 202 covers only one of primary body 204 and front 114 in the unlocked position allowing engagement of button 122 and release of door 120.

In some embodiments, a spring 206 is provided to bias or motivate outer panel 202 to the locked or, alternatively, unlocked position. Generally, as shown in FIGS. 3, 4 and 9, spring 206 is attached to outer panel 202. As shown in FIGS. 3 and 4, spring 206 may be placed adjacent and parallel to axis LA, on inner side 234 of outer panel 202. Additionally or alternatively, as shown in FIG. 9, spring 206 may be centrally placed on inner side 234, spring 206 extending in the direction perpendicular to the transverse direction T that outer panel 202 moves along between the locked position and the unlocked position (lateral direction L in FIG. 9).

In some embodiments, spring 206 includes a first end 220 and a second end 222, and a middle coil 224 therebetween. Middle coil 224 is attached to first end 220 and second end 222, middle coil 224 forming the bulk of spring 206 with first end 220 and second end 222 on either side of middle coil 224. As shown in FIGS. 3 and 4, outer panel 202 may be in receipt of first end 220, with body edge 208 in receipt of second end 222. Additionally or alternatively, as shown in FIG. 9, outer panel may be in receipt of first end 220 with underside of primary body 204 in receipt of second end 222. Thus spring 206 may be connected to primary body 204 and outer panel 202 in the unlocked position, allowing engagement or movement of primary body 204 with outer panel 202 only covering a portion of primary body 204 and removed from front 114, as discussed herein. In certain embodiments, front 114 is in receipt of second end 222, as would be understood in light of the present disclosure.

As shown in FIGS. 2 through 4, outer panel 202 may include or otherwise be formed as a lid. In some embodiments, lid 202 comprises a first edge 230, an outer side 232, and inner side 234. First edge 230 may be adjacent to outer side 232 and to inner side 234. Outer edge 232 and inner side 234 may be on opposing sides of lid 202. When assembled, outer side 232 may be located parallel to front 114 in the locked position. Inner side 234 may be located on an opposing side to outer side 232 in transverse direction T. Inner side 234 may face (e.g., in transverse direction T) primary body 204. For example, in locked position, inner side 234 may contact or be opposite to primary front side 248. First edge 230 may be perpendicular to inner side 234 or outer side 232. First edge 230 may contact or face body edge 208. For example, as shown, first edge 230 may extend parallel to body edge 208, both edges 230 and 208 extending in vertical direction V and extending inwardly in transverse direction T. Alternatively, edges 230 and 208 may extend in lateral direction L and inwardly in transverse direction T (not shown). Additionally or alternatively, lid 202 may further include a handle 236. As shown, handle 236 is located on outer side 232 of lid 202. Handle 236 may provide or include as a ledge or protrusion to allow a user to readily pivot lid 202 into the unlocked position. Handle 236 may include or define a semi-circle profile, as shown in FIG. 3 or may be another suitable shape, as would be understood in light of the present disclosure.

Lid 202 may further include a pin 218 to connect lid 202 to microwave (e.g., at front 114 or body cavity 118). In some embodiments, lid 202 may include a plurality of pins 218, each pin 218 extending along axis LA in vertical direction V. In some embodiments, lid 202 may be connected to front 114 with a receiving sleeve 226. For example, top body edge 142 and bottom body edge 144 may attach to receiving sleeve 226 to house pins 218 of lid 202. Pins 218 may be set in receiving sleeve 226. Attachment of pins 218 to receiving sleeve 226 may be a friction fit. In some embodiments, pins 218 may extend from body cavity 118 or front 114 and receiving sleeve 226 may be attached to lid 202. Pivot axis LA may be perpendicular to the transverse direction T. During use, lid 202 may open by pulling on handle 236 and rotating about pivot axis LA along pins 218 and receiving sleeve 226. Pivot axis LA may be proximal to body edge 208 and may extend along the vertical direction V. In some embodiments, axis LA may be in a different direction and receiving sleeve 226 and pins 218 may be connected along a different edge of body cavity 118. For example, lid 202 may open by pulling on handle 236 and rotating about an axis in the lateral direction L, and pins 218 may be proximal to top body edge 142 or bottom body edge 144 (not shown). Other configurations of attaching lid 202 in a pivoting fashion may also be used in alternative embodiments or as would be understood in light of the present disclosure.

In some embodiments, spring 206 connects to inner side 234 of lid 202. Additionally or alternatively, spring 206 may connect to body edge 208 of body cavity 118 defined on front 114. As shown in FIG. 5, spring 206 may be a torsion spring 206. The first end 220 and the second end 222 may extend perpendicular to middle coil 224 in torsion spring 206. Torsion spring 206 may be biased in locked position. During use, first end 220 and second end 222 may extend opposite to one another, biasing lid 202 toward the locked position. In some embodiments, first end 220 and second end 222 may extend roughly perpendicular to one another in a rested or biased position. During use, first end 220 and second end 222 may extend roughly parallel to one another in the unlocked position, lid 202 pivoted roughly perpendicular from the location of lid 202 in the locked position (e.g., as shown in FIG. 3)

During use, lid 202 may lift, rotating about an axis (e.g., lid axis LA), in the unlocked position, revealing primary body 204. Spring 206 may be compressed or coiled by lifting of lid 202 into unlocked position. As used herein "compressed" includes reduction in size or an increase in tension, including tightening or increased coiling, in the case of a spring. Spring 206 motivates outer panel 202 to locked position from unlocked position. For example, spring 206 is biased toward locked position, and movement of lid 202 into unlocked position compresses spring 206 into unlocked position. Advantageously, outer panel 202 is disposed to return to the locked position when not moved (e.g., by a user) and held in the unlocked position, which limits access to the primary body 204. Such limitation of access to the unlocked position or to primary body 204 may decrease or eliminate unintentional or unwanted opening of door 120 allowing access to the cooking chamber only with a two-step opening process.

Turning to FIGS. 7 through 9, FIG. 7 depicts outer panel 202 comprising a slide lever 202 in the locked position. FIG. 8 depicts outer panel 202 comprising a slide lever 202 in the unlocked position. FIG. 9 depicts an underside of slide lever 202 and primary body 204 with spring 206.

In additional or alternative embodiments, outer panel is a slide lever 202. In some embodiments, slide lever 202 includes a top lever side 240, an inner lever side 234, a left lever side 244 and a right lever side 246. Top lever side 240 and inner lever side 234 may be opposing sides. Left lever side 244 and right lever side 246 may be perpendicular to top lever side 240 and inner lever side 234. Right lever side 246 may be an opposing side to left lever side 244. Slide lever 202 may be slidably disposed on primary body 204. For example, slide lever 202 may be moveable in a direction perpendicular to the transverse direction T between the unlocked position and the locked position. Slide lever 202 may be housed at least partially within primary notch 250, as discussed herein. In some embodiments, slide lever 202 is connected to primary body 204. For example, slide lever 202 may be translatable or slidable along primary front side 248. In some embodiments, slide lever 202 may further be connected to primary body 204 by way of spring 206, spring 206 attached to primary body 204 and to slide lever 202. As shown, inner lever side 234 may connect with primary body 204 (e.g., on a primary front side 248 of primary body 204). For example, inner side 234 of slide lever 202 may be slidable along primary front side 248 between the locked position and the unlocked position.

Additionally or alternatively, slide lever 202 may be connected to front 114 of cabinet 102. In some embodiments, inner side 234 slides across a portion of front 114 in the locked position. Slide lever 202 may be biased to the locked position, slide lever 202 covering a portion of front 114 in the locked position, with inner side 234 touching or otherwise connected to at least a portion of front 114. This connection may prevent movement of primary body 204 located inward from slide lever 202 in the transverse direction T. Slide lever 202 may be connected to spring 206 (e.g., compression spring 206 of FIG. 9). For example, first end 220 may be attached to slide lever 202 at inner side 234. Spring 206 may compress with movement of slide lever 202 into the unlocked position.

Slide lever 202 may be selectively disposed over a portion of front 114 and a portion of primary body 204 in locked position, as shown in FIG. 7. For example, in locked position, slide lever 202 extends between primary body 204 and cabinet 102 in locked position. In other words, slide lever 202 covers a portion of front 114 and a portion of primary front side 248 in locked position. In unlocked position, slide lever 202 may cover one of primary body 204 and cabinet 102. For example, as shown in FIG. 8, slide lever 202 may be disposed on primary body 204 in unlocked position. In additional or alternative instances, slide lever 202 may be disposed on front 114 in unlocked position.

Compression spring 206, as shown in FIG. 9, has a spring first end 220, a spring second end 222 and a middle coil 224. As shown, first end 220 and second end 222 extend along parallel or in the same direction (e.g., in lateral direction L) to the length of middle coil 224. Compression spring 206 may be connected to slide lever 202. In some embodiments, compression spring 206 may further be connected to primary body 204. For example, second end 222 may be attached to inner side of primary body 204. Compression spring 206 compresses in the unlocked position and is biased toward the locked position. In other words, spring 206 may be compressed in the unlocked position.

Aspects of the present subject matter are directed to a method and system that may focus on a two-step door opening technology of a microwave oven for a child-proof or a child-resistant door. In some embodiments, a push button may be assembled on the control panel for having a push-to-open door release mechanism. The two-step door opening methods may include a method with the following steps. In the first step, the push-to-release button on the control panel may be covered with a spring-loaded top cover to make the top cover to be opened and closed. The cover may be opened by a user (e.g., fingers) to get access to release (e.g., by a user pressing the primary body) button and the cover may be returned back by the spring. After the cover is opened, the release button (e.g., primary body 204) may be pressed down to open or release the door. The release button may be provided with stoppers (e.g., seating tabs 252) and a coil spring (e.g., spring 206), where the stoppers are to hold the button and the coil springs are assembled to the boss of button to return the button automatically. In additional or alternative embodiments, a method includes a stopper and slide lever. The stopper and slide lever may be arranged at one edge of the release (push) button to lock and unlock the button. The slide lever may be pushed inwards of the release (push) button to unlock. After the button is unlocked, the release (push) button may be pressed down to open the door. Coil springs may be attached to the bottom of the button to return the button automatically to its normal state.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A microwave oven having a vertical, a transverse, and a lateral direction, the microwave oven comprising:
- a cabinet defining a cooking chamber,
- a door pivotably attached to the cabinet, the door configured to selectively allow entry to the cooking chamber, and
- a button for opening the door, the button comprising:
  - an outer panel moveable between a locked position and an unlocked position, wherein the outer panel comprises a lid that is rotatably connected to the cabinet along a first edge of the lid to rotate between the locked position and the unlocked position, and
  - a primary body located below the outer panel, the primary body being accessible in the unlocked position, wherein the lid is selectively disposed over the primary body in the locked position.

2. The microwave oven of claim 1, wherein the outer panel is biased toward the locked position.

3. The microwave oven of claim 1, wherein the outer panel further comprises a spring in biased engagement with the outer panel, the spring motivating the outer panel to the locked position.

4. The microwave oven of claim 1, wherein the outer panel further comprises a torsion spring connected to the lid and to the cabinet, the torsion spring biasing the outer panel to the locked position.

5. The microwave oven of claim 1, wherein the outer panel comprises a slide lever slidably disposed on the primary body, the slide lever extending between the primary body and the cabinet in the locked position and preventing movement of the primary body.

6. The microwave oven of claim 5, wherein the outer panel further comprises a compression spring connected to the slide lever and to the primary body, the compression spring biasing the slide lever perpendicular to the transverse direction in front of the primary body.

7. The microwave oven of claim 5, wherein the slide lever is laterally movable between the unlocked position and the locked position.

8. The microwave oven of claim 1, the primary body being attached to the outer panel, wherein the primary body is slidable in the transverse direction into the microwave oven in the unlocked position.

9. The microwave oven of claim 1, wherein the cabinet defines a body cavity rearward from the outer panel along the transverse direction, primary body and wherein the primary body is received within the body cavity.

10. A microwave oven having a vertical, a transverse, and a lateral direction, the microwave oven comprising:
- a cabinet defining a cooking chamber,
- a door pivotably attached to the cabinet, the door configured to selectively allow entry to the cooking chamber, and
- a button for opening the door, the button comprising:
  - an outer panel moveable between a locked position and an unlocked position,
  - a primary body located below the outer panel, the primary body being accessible in the unlocked position, and
  - a spring in biased engagement with the outer panel, the spring motivating the outer panel to the locked position.

11. The microwave oven of claim 10, wherein the spring is compressed in the unlocked position.

12. The microwave oven of claim 10, wherein the outer panel comprises a lid selectively disposed over the primary body in the locked position.

13. The microwave oven of claim 12, wherein the lid is rotatably connected to the cabinet along a first edge of the lid, the lid moveable along an axis along the first edge of the lid between the locked position and the unlocked position.

14. The microwave oven of claim 13, wherein the spring comprises a torsion spring connected to the lid and the cabinet.

15. The microwave oven of claim 10, wherein the outer panel comprises a slide lever slidably disposed on the primary body, the slide lever extending between the primary body and the cabinet in the locked position and preventing movement of the primary body.

16. The microwave oven of claim 15, wherein the spring comprises a compression spring, the compression spring connected to the slide lever and to the primary body, and
- wherein the compression spring biases the slide lever perpendicular to the transverse direction in front of the primary body.

17. A microwave oven having a vertical, a transverse, and a lateral direction, the microwave oven comprising:
- a cabinet defining a cooking chamber,
- a door pivotably attached to the cabinet, the door configured to selectively allow entry to the cooking chamber, and
- a button for opening the door, the button comprising:
  - an outer panel moveable between a locked position and an unlocked position, and
  - a primary body located below the outer panel, the primary body being accessible in the unlocked position, wherein the outer panel comprises a slide lever slidably disposed on the primary body, the slide lever extending between the primary body and the cabinet in the locked position and preventing movement of the primary body, wherein the outer panel further comprises a compression spring connected to the slide lever and to the primary body, the compression spring biasing the slide lever perpendicular to the transverse direction in front of the primary body.

18. The microwave oven of claim 17, wherein the slide lever is laterally movable between the unlocked position and the locked position.

* * * * *